United States Patent
Taylor et al.

(10) Patent No.: US 6,178,270 B1
(45) Date of Patent: Jan. 23, 2001

(54) METHOD AND APPARATUS FOR SELECTING TEXT AND IMAGE DATA FROM VIDEO IMAGES

(75) Inventors: Michael J. Taylor, Guildford (GB); Joe S. C. Lee, Vancouver BC (CA)

(73) Assignee: Xerox Corporation, Stamford, CT (US)

( * ) Notice: Under 35 U.S.C. 154(b), the term of this patent shall be extended for 0 days.

(21) Appl. No.: 09/081,266

(22) Filed: May 19, 1998

(30) Foreign Application Priority Data

May 28, 1997 (GB) .................................................. 9711022

(51) Int. Cl.[7] ....................................................... G06K 9/36
(52) U.S. Cl. ............................ 382/284; 382/173; 382/289; 358/453
(58) Field of Search ............................ 382/284, 289–293, 382/171, 177, 155, 173–179; 358/452–453, 1.6, 462; 345/339, 336

(56) References Cited

U.S. PATENT DOCUMENTS

| | | | |
|---|---|---|---|
| 4,667,248 | 5/1987 | Kanno ................................ | 358/452 |
| 5,187,753 | 2/1993 | Bloomberg et al. ................ | 382/289 |
| 5,335,290 | * 8/1994 | Cullen et al. ....................... | 382/176 |
| 5,355,420 | 10/1994 | Bloomberg et al. ................ | 382/155 |
| 5,452,374 | 9/1995 | Cullen et al. ....................... | 382/293 |
| 5,506,918 | 4/1996 | Ishitani .............................. | 382/289 |
| 5,511,148 | 4/1996 | Wellner .............................. | 358/1.6 |
| 5,517,586 | * 5/1996 | Knowlton ........................... | 382/292 |
| 5,892,842 | * 4/1999 | Bloomberg ......................... | 382/173 |
| 5,966,124 | * 10/1999 | Devine ............................... | 345/339 |

FOREIGN PATENT DOCUMENTS

| | | |
|---|---|---|
| 0 287 027 A2 | 10/1988 | (EP) . |
| 0 431 962 A2 | 6/1991 | (EP) . |
| 0 434 415 A2 | 6/1991 | (EP) . |
| 0 515 862 A2 | * 5/1992 | (EP) .............................. G06F/15/62 |
| 0 495 622 A2 | 7/1992 | (EP) . |
| 0 622 722 A2 | 11/1994 | (EP) . |
| 2 513 780 | 4/1983 | (FR) . |
| WO 96/05570A1 | 2/1996 | (WO) . |

OTHER PUBLICATIONS

European Search Report for EPO counterpart Application No. EP 98 30 4196, Sep. 2, 1999.

* cited by examiner

*Primary Examiner*—Leo H. Boudreau
*Assistant Examiner*—Ishrat Sherali (57) ABSTRACT

A method carried out in an image processing system in which images of documents are captured by an image capture device, such as a video camera, comprising: (a) displaying successive images captured by the video camera, each image being defined by grayscale image data and containing text matter, (b) receiving a first user input (mouse button click) defining the start of a selection and a first position within the displayed image, (c) in response to the first user input, freezing the displayed image, (d) determining the skew angle of text matter with respect to the field of view of the video camera, (e) receiving at least one further user input (further button click; drag of cursor), including a final user input (mouse button release), defining the end of a selection, and for the or each further user input, (f) determining, using the skew angle determined in step (d), the position, shape and dimensions of a selection element in dependence upon at least the first position, and (g) displaying the selection element superimposed on the frozen displayed image. The selection element may be a rectangle, or a selection block highlighting one or more words of text.

16 Claims, 12 Drawing Sheets

INFORMATION ENGINEERING AND SOCIETY 9 information would become *the* most important economic resource, and information engineering one of the three larger industries by the end of the century; but as the other two were to be oil and automobiles it seems possible that, like all analogue devices, the crystal balls had a rather poor signal-to-noise ratio at the time.

It was their possible use in professional education that introduced this brief consideration of the convergence of computing and communications, and it is to the education of engineers that I should like to turn. In doing so I fell like a layman offering to preach to the bench of bishops, but I promise to spare you a layman's naïve exposition of such well-worn questions as whether education should be for living, or merely for earning a living. My interest lies at the more mundane level of the balance between theory and practice; in my own case I would have preferred more chemistry and less cookery, fewer recipes and more insight. Of the practical facts that I learned those that were relevant to my occupation quickly became obsolete; and as for the others - that is the majority, I nether recall nor regret their regress into oblivion. Even so, I still have facts that I have never used. I was taught more about the properties of wet steam than I wished to know.

The facts of engineering practice, in particular, will change several times during a student's working life and we have Disareli's warning that 'A practical man is a man who practises the errors of his forefathers.' This is precisely what we British must not do, for it is a commonplace that our island economy rests on converting the fewest imports into the most exports; and that for this purpose we require every possible contribution which innovation and high technology can make to increasing the competitiveness of our goods. Innovation is exclusive and seems to obey the law of small numbers, for creation is an individual, not a corporate—act. In seeking to educate for innovation, therefore, we can only reach for the blunderbuss and aim to ensure that all engineering graduates are equipped as potential inventors, with their imaginations stimulated not stifled, bursting with curiosity and infected with iconoclasm; not satiated with facts, but hungry for new answers to old problems; not trained in dissection and analysis only, but in synthesis and design also. Perhaps we could learn from the teaching of Art.

METHOD AND APPARATUS FOR SELECTING TEXT AND IMAGE DATA FROM VIDEO IMAGES

BACKGROUND OF THE INVENTION

1. Field of the Invention

The present invention relates to image processing, and more particularly relates to techniques for providing text and image selection from document images captured using a video camera.

2. Description of Related Art

Conventional word processor applications for the personal computer enable a user to select text or image portions within a document, corresponding to an electronically stored file, by means of button presses and dragging of a mouse cursor.

The situation is quite different when the displayed document is that captured by a document camera providing grayscale, and usually relatively low resolution, images, such as those employed in over-the-desk scanning systems. It is known to use, in such over-the-desk scanning systems, a video camera disposed above a desk to capture images of documents which are displayed to a user on a CRT monitor or other display device. More details of such systems are disclosed, for example, in EP-A-622,722 and British Patent Application 9614694.9. The capture of the document images may be for display in situ, or for transmission to a remote location as part of a videoconferencing tool.

However, a problem encountered with systems that capture images with a camera is how to provide a very efficient text selection interface for interactive face-up document camera scanning applications. There exits, therefore, a need for techniques that support the selection of rectangular regions of text and images within an image captured by the camera via a "click-and-drag" of the mouse defining two points, or a leading diagonal, and for techniques providing, in much the same way as a word processor interface, for single and multi-word text selection from such a document.

SUMMARY OF THE INVENTION

In accordance with the invention, there is provided a method, and apparatus therefor, for selecting text and image data from documents with an image processing system in which images of documents are captured by an image capture device having a field of view. The method includes the steps of: (a) displaying an image captured by the image capture device; the displayed image containing text matter being defined by one of grayscale image data and color image data; (b) receiving a first user input defining both a start of a selection and a first position within the displayed image; (c) responsive to said step (b), freezing the displayed image to define a frozen displayed image; (d) determining a skew angle $\theta$ of the text matter with respect to the field of view of the image capture device; (e) receiving a second user input defining both an end of the selection and a second position within the displayed image; the second user input defining a final user input; (f) determining, using the skew angle $\theta$ determined in said step (d), a selection element; the selection element having a position, a shape, and dimensions that are, at least, dependent upon the first position; and (g) displaying the selection element superimposed on the frozen displayed image.

BRIEF DESCRIPTION OF THE DRAWINGS

These and other aspects of the invention will become apparent from the following description read in conjunction with the accompanying drawings wherein the same reference numerals have been applied to like parts and in which:

FIG. 1 is view from above a desk of a document from which a text portion is to be selected in an over-the-desk scanning system according to an embodiment of the present invention;

FIG. 2 shows the same view as in FIG. 1, after a user has finished selecting the text portion;

FIG. 10A–10C illustrate histograms formed of horizontal gaps between the connected components of equal font size, in which FIG. 10A illustrates the ideal bimodal distribution, FIG. 10B illustrates real data with two attempted curve fittings, and FIG. 10C illustrates the fitting of a Gaussian curve;

DETAILED DESCRIPTION

A. System Configuration

It will be appreciated that the techniques according to the present invention may be employed in any system or application where selection of a text portion from a multiple bit-per-pixel (e.g. grayscale or color) image is required. Such instances include videoconferencing systems, scanning systems, especially the aforementioned over-the-desk scanning systems, multifunction devices, and the like. It will be further appreciated that the invention may be implemented using a PC running Windows™, a Mac running MacOS, or a minicomputer running UNIX, which are well known in the art. For example, the PC hardware configuration is discussed in detail in *The Art of Electronics,* 2nd Ed., Ch. 10, P. Horowitz and W. Hill, Cambridge University Press, 1989. In the case of over-the-desk scanning, the invention may form part of the systems described in any of EP-A-495,622, EP-A-622,722, or British patent application 9614694.9. The invention has been implemented in C++ on an IBM compatible PC running Windows® NT.

B. Rectangular Text Region Selection via Skew Detection

This section describes a text selection technique that enables rectangular text region selection. The user defines a leading diagonal of the rectangle with a mouse. Automatic text skew detection is used to calculate the required image selection. Skew recovery is made efficient by analyzing the image in the neighborhood of the mouse input.

FIG. 1 is view from above a desk of a document from which a text portion is to be selected in an over-the-desk scanning system incorporating an embodiment of the present invention.

Figure 12:
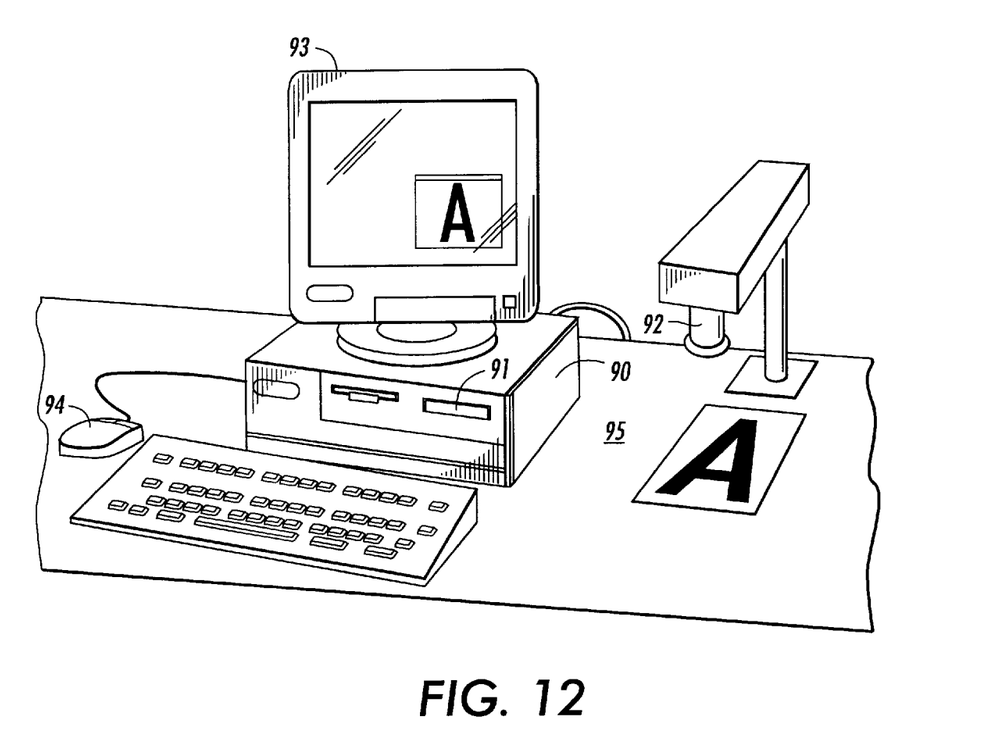
FIG. 12 illustrates an example of an image processing system for performing the present invention.

Initially, a document 2 is open on the user's desk (e.g., desk 95 in FIG. 12), and the user has positioned the document 2 so that the paragraph 4, which he wishes to scan/copy, is within the field of view 6 of the camera (e.g., camera 92 in FIG. 12). Images (grayscale) of the document 2 are captured and displayed to the user as feedback. As discussed in the aforementioned British patent application 9614694.9, the content of the field of view 6 may be displayed (as live video images) within a window of any suitable display device, such as a CRT or LCD display. Using a conventional mouse, the user is able to control the cursor position in a familiar way; and the start of the selection of the paragraph 4 begins with the user pressing the left mouse button with the cursor at initial position 8. While the left mouse button remains pressed, the user makes a generally diagonal line (top left to bottom right): an intermediate cursor position 8' during this motion is shown.

FIG. 2 shows the same view as in FIG. 1, after a user has finished selecting the text portion: end of selection by the user is inputted by the user releasing the left mouse button when the cursor is at the final cursor position 8". As can be seen, the text of document 2 is skewed with respect to the coordinate space of the camera's field of view 6: the angle of skew θ must be determined.

Figure 3:
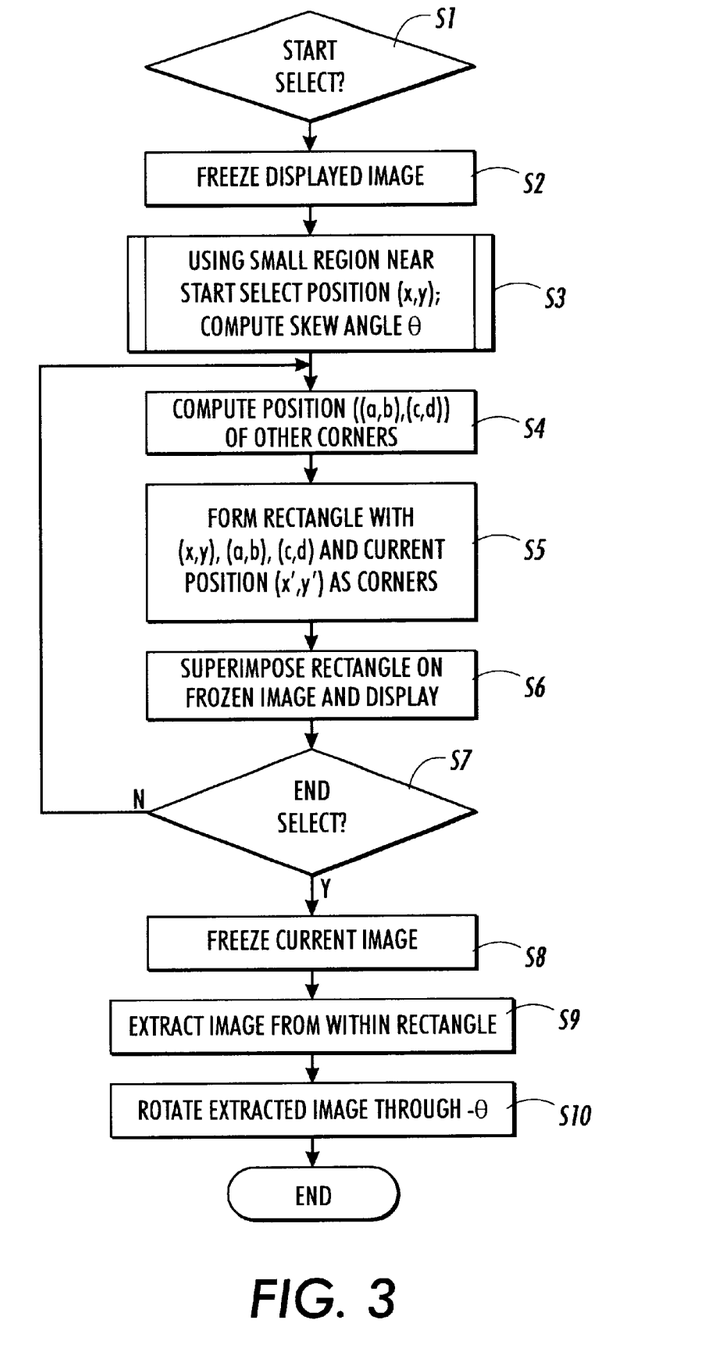
FIG. 3 is a flow chart of the steps in providing text selection in accordance with an embodiment of the present invention.

FIG. 3 is a flow chart of the steps in providing text selection in accordance with an embodiment of the present invention. Initially, the start of selection user input is detected (step S1). Immediately (step S2), the image (i.e. within the field of view 6) displayed to the user is frozen on the display device (e.g., display device 93 in FIG. 12). Next, a routine (step S3) is performed to determine the skew angle θ, as is described in further detail below. Returning to FIG. 2, once the value of θ is obtained, the positions within the coordinate space of the display window of a selection rectangle (or more generally, a selection element) 10, which is to be displayed as feedback to the user, must be determined; the requirement being that, to provide a pleasing interface for the user, the selection rectangle 10 must be at the same skew angle θ. The coordinates ((x, y), (x', y')) corresponding to the initial and current cursor positions 8 and 8", respectively, are known. Using simple geometric relations, the coordinates (a, b) and (c, d) of the other corners of the rectangle 10 can readily be calculated. The skew angle θ is normally a small angle: generally it will be less than 5°.

As shown in FIG. 3, a rectangle is formed (step S5) with (x, y), (x', y'), (a, b) and (c, d) at the corners. This rectangle is then superimposed (step S6) on the stored frozen image data, and the resulting image displayed. A test is then made at step S7: if the user has finished selecting step S8 is performed (i.e. an input received indicating that he has released the left mouse button), and if he has not, processing returns to step S4. (For illustrative purposes, the final cursor position 8" is used as the 'current' cursor position, although it will be appreciated that this process may be carried out continually during the user's diagonal movement of the cursor.)

If the user has finished selecting, the current image is frozen (step S8) in the display (window). Then, the image data for the image (here: the paragraph 4) present within the selection rectangle 10 is extracted (step S9) from that for the image within the field of view 6, and the extracted image is then rotated (step S10) through-θ, so as to ready it for further processing, such as OCR.

Figure 4:
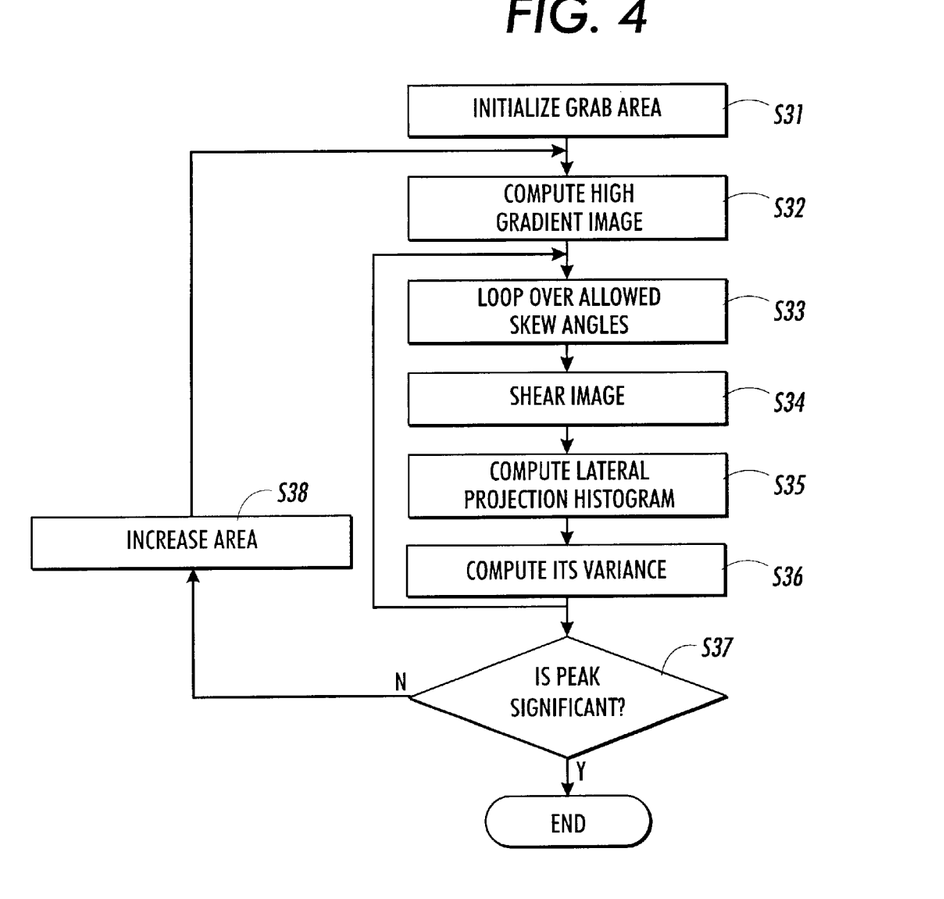
FIG. 4 shows the sub-steps employed in implementing the skew detection step in FIG. 3.
Figure 6A:
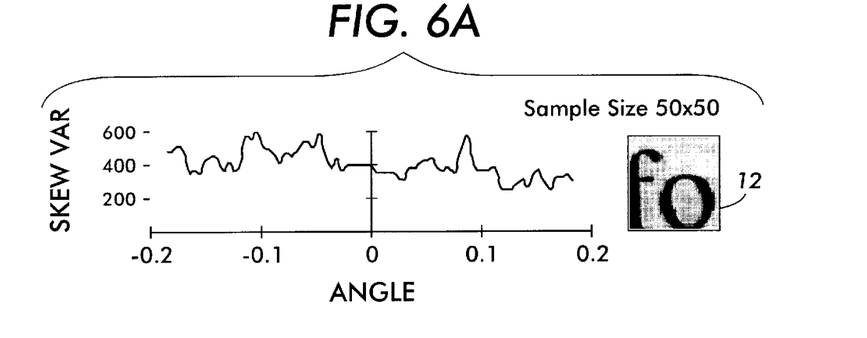
FIGS. 6A–6C illustrate the effect of varying the size of the test image portion on the effect of the skew detection sub-step in FIG. 4.
Figure 6B:
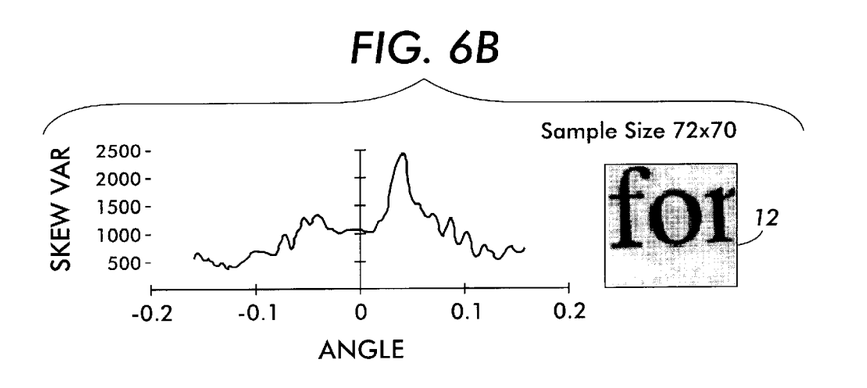
Figure 6C:
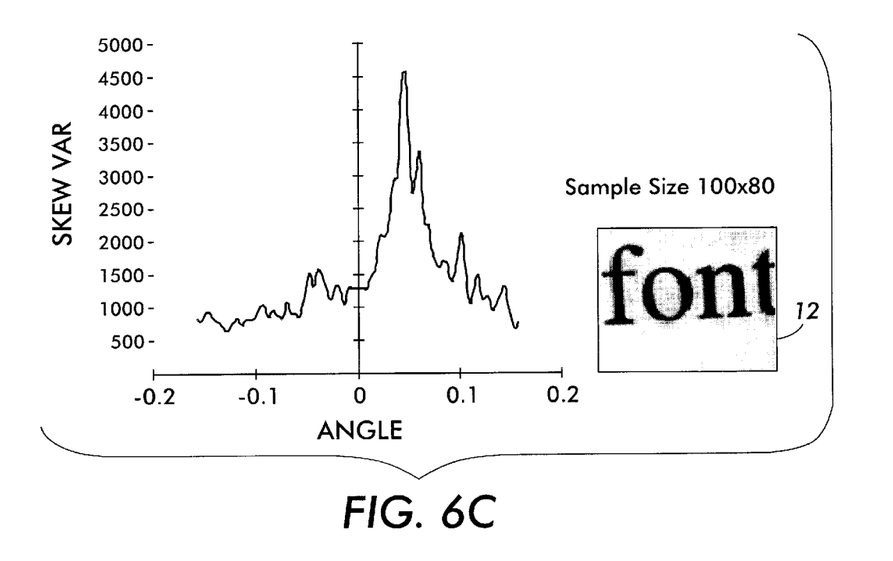

FIG. 4 shows the sub-steps employed in implementing the skew detection step S3 in FIG. 3. This routine is based on the techniques, described in U.S. Pat. No. 5,187,753 and U.S. Pat. No. 5,355,420, for maximizing the variance of the laterally projected profile of differences over a range of skew angles, where the rotation of the image is made efficient by only performing vertical shears. The process begins (step S31) by initializing a grab area 12 (a small rectangular area to the right and below the cursor position such as shown in FIGS. 6A–6C (discussed further below)). Suitably, the grab area 12 is just large enough for a few lines of text, and perhaps a couple of lines of 10-point text.

In order to minimize the amount of time taken to compute skew, we attempt to analyze the smallest amount of the image as we can. The algorithm is capable of resolving skew with less than two lines (it has been found) but the problem is clearly that it is not known how large the font size is before the skew angle has been determined.

To this end, an initial sample size (grab area 12) that is large enough to capture several lines of text at a "most likely" font size of between 10–12 point is used. Further, this initial region is to the right and below the initial "click", which assumes that the mouse is being dragged from top-left to bottom-right and that the skew angle is not too great (typically ±5 degrees). Because this is the most common font size that is selected using the interface, this gives an overall optimum response time.

The next step S32 involves the computation of a high gradient image from the image within the initial grab area 12. The images of the document in FIG. 1 are grayscale images. An option is to threshold the image and then pass it to a skew detection algorithm. However, under uncontrolled lighting conditions, thresholding is potentially quite computationally expensive.

Figure 5:
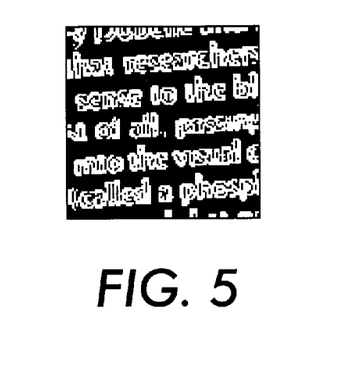
FIG. 5 shows the effect of the sub-step in FIG. 4 of computing a high gradient image.

FIG. 5 shows the effect of the step S32 in FIG. 4 of computing the high gradient image, which is accomplished using the familiar Sobel operator (discussed in more detail in Jähne B., *Digital Image Processing*, section 6.3.2, Springer-Verlag, 1991). In the resultant high gradient image of FIG. 5, each white pixel is the result of the gradient in the original (grayscale) image at that point being greater than a predetermined threshold, and each black pixel is the result of the gradient in the original (grayscale) image at that point being less than the predetermined threshold. The high-gradient image (used as the input for the skew detection) is easily computed from the grayscale supplied by the document camera and is a very reliable substitute for a fully thresholded image.

Computations are next performed, at step S33, on the image data for the high gradient image for each of the allowed set of skew angles (e.g., +5° to −5° in increments of 0.1°; although any suitable regime may be employed—see for example, U.S. Pat. No. 5,187,753 and U.S. Pat. No. 5,355,420). In each case, the image is sheared (step S34) to approximate the rotation. Here, a technique used in the vertical shearing procedure that lies at the heart of the angular search is to wrap around the vertical shift. In other words, the pixels that are pushed out of the top of the region are re-inserted at the bottom in the same column. This way the variance profiles are always calculated on a rectangular region which makes everything neater, if not more reliable.

For the given angle, a lateral projection histogram for the image is computed (step S35). Based on the histogram data, the variance for the given angle is calculated (step S36). A plot of variance against angle (of rotation) may thus be plotted, as shown in FIG. 6A. The ability of the technique to determine the skew angle depends on the size of the initial grab area 12 relative to the font size; and the absence of a discernible peak in FIG. 6A indicates that the computation has been unsuccessful. A test is made at step S37 to determine whether the highest peak in the plot of skew variance versus angle is significant (a simple SNR based test), such as by determining whether the ratio of the peak value to the average value is greater than a predetermined value. If the peak is not significant, the size of the initial grab area 12 is increased (step S38), and the processing returns to step S32. The grab area 12 is expanded in the vertical direction more than the horizontal as it is in that direction that the most skew-pertinent information lies. This is done until an empirically defined threshold on the SNR (in this case defined to be the maximum variance divided by the mean variance) is reached.

FIGS. 6B and 6C illustrate the effect of varying the size of the grab area 12 on the effect of the skew detection sub-step in FIG. 4, in the case where the font size is 36 pt. Clearly, a significant peak is ascertained for FIG. 6B, from which a skew angle of 0.35° can be derived. This shows that very little text is needed for a good skew confidence: the grab area 12 of FIG. 6B is sufficient for the determination, and there is no need to expand to a larger area 12 of FIG. 6C. In a preferred embodiment, the first grab area 12 is 100×100 pixels, the next largest is 200×200 pixels, and the next largest is 300×300 pixels. If the latter fails, a value of $\theta=0$ is returned.

The above description outlines the situation where text matter (paragraph 4) is sought to be selected by the user. However, the techniques according to the invention may be used for the selection of graphical objects within a document, and the aforementioned techniques have also been found to work well with graphics and line drawings.

The algorithm described in this section is very efficient, and the delay between starting to drag out the leading diagonal and the skew being detected is of the order of 0.5 seconds on standard PC hardware, and slightly longer for larger and less common font sizes.

In addition, it will be appreciated that provision may be made, suitably using techniques for the resizing and moving of windows in the MS Windows® environment, allowing the user to resize and/or reposition the selection rectangle 10 after it has been formed by releasing the left mouse button.

C. Single and Multi-Word Selection Methods

This section describes a single and multi-word text selection process, the aim being to imitate a common word processor interface, i.e. double click selects a word and "click-and-drag" may define a non-rectangular text region.

Figure 7A:
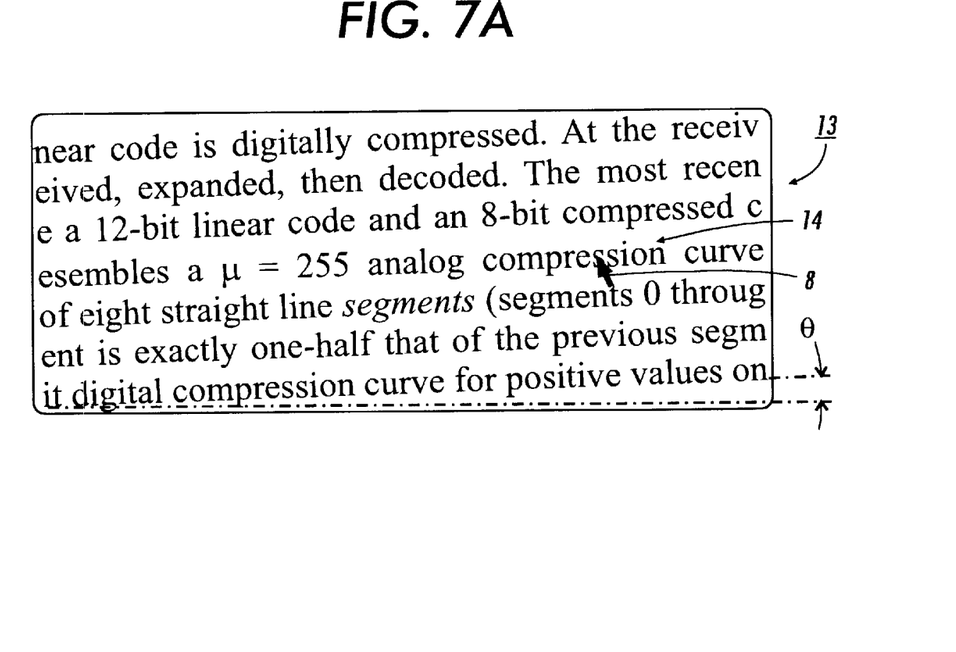
FIG. 7A shows a portion of captured and displayed text from which a user makes a selection.

FIG. 7A shows a portion 13 of captured and displayed text from which a user makes a selection. The selection may be of a single word, or of multiple consecutive words.

In this case, the user selects, using a cursor controlled by a mouse (see an example in FIG. 12, element 94) in the conventional manner, from the portion 13 of displayed text matter a word 14 ("compression"): the user performs a "double-click" with the left mouse button with the mouse cursor in an initial position 8. As is shown (slightly exaggerated for the sake of illustration), the text matter is skewed by an angle $\theta$ with respect to the display coordinate space. Appropriate feedback must be displayed to the user, overlaid on the word 14, to show that it has been selected.

Figure 7B:
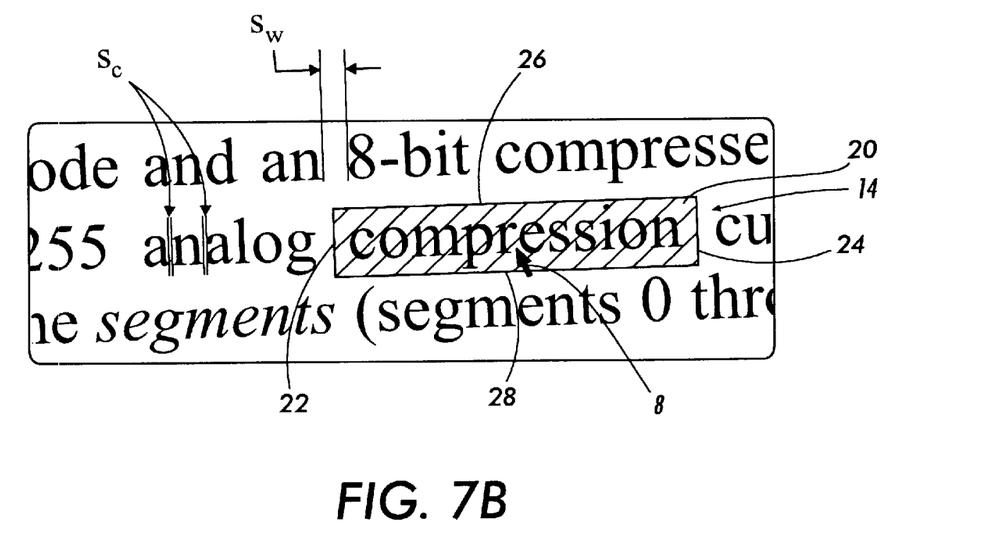
FIG. 7B shows in magnified form, part of the text matter of FIG. 7A, showing a selected word.

FIG. 7B shows in magnified form, part of the text matter of FIG. 7A, showing a selected word 14. To indicate selection, a selection block 20 is displayed overlaid on the word 14. (Here the block 20 is shown using hatching for the sake of illustration, but generally will comprise a solid black or colored block, with the characters of the word 14 appearing as white or "reversed out".) The selection block 20 has vertical sides 22, 24 and horizontal sides 26, 28. The sides 22, 24 are positioned midway between the selected word 14 and the two adjacent words in the line—"analog" and "curve" respectively—and for this computations based on measured values of the inter-character separation ($s_c$) and the inter-word spacing ($s_w$) must be made, as described further below.

In addition, the sides 26, 28 are positioned midway between the line containing the selected word 14 and the line of text above and below it, respectively. The sides 26, 28 are also skewed by $\theta$ with respect to the horizontal dimension of the display, thereby providing appropriately-oriented selection feedback (block 20).

Figure 8:
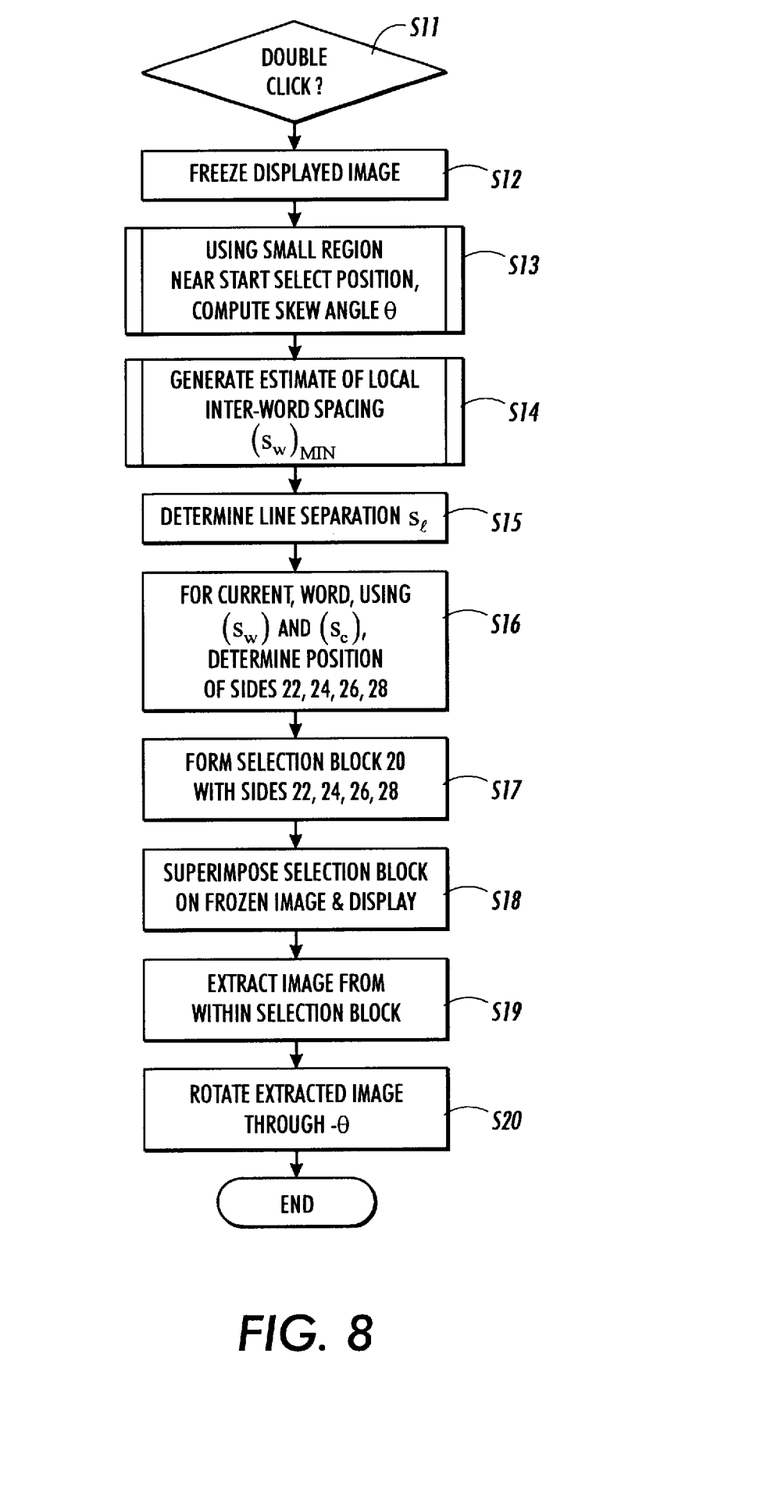
FIG. 8 is a flow chart showing the processing steps performed in providing the selection feedback illustrated in FIG. 7.

FIG. 8 is a flow chart showing the processing steps performed in providing the selection feedback illustrated in FIG. 7. Initially (step S11), a user's double click of the left mouse button (i.e. first and second user inputs in rapid succession) is detected; and the displayed image is immediately frozen (step S12; although it will be appreciated that the freezing will occur upon the first of the "clicks" being made).

An operation is then performed (step S13), using a small (local) region near (typically below and to the right of) the initial cursor position 8 (at the first mouse click), to determine the angle $\theta$ at which the text is skewed: this is described in detail above, with reference to FIG. 4. Then, a routine (step S14) is performed to generate, for the small local region, an estimate of the inter-word spacing (threshold) $(s_w)_{min}$ (corresponding to $(s_c)_{max}$)—the threshold spacing above which the spacing must be an inter-word spacing rather than an inter-character spacing. A determination is then made (step S15), using known techniques, of the line separation (or spacing) $s_l$ within the small local region: this is the separation between the maximum height of characters on one line and the lowest level for characters on the line above it; and this enable the positions of the sides 26, 28 of the selection block 20 (FIG. 7B) to be determined.

In step S16 this determination is made, together with a calculation of the positions of the sides 22, 24 of the selection block 20: side 22 is $\frac{1}{2}(s_w)_{min}$ to the left of the character "c" in the selected word 14 ("compression"), and side 24 is $\frac{1}{2}(s_w)_{min}$ to the right of the "n" in the selected word 14. The selection block 20 with these sides is formed in step S17, and then in step S17 the selection block 20 is overlaid on the frozen image and the result displayed.

If the user has finished selecting, the current image is frozen (step S18) in the display (window). Then, the image data for the image (here: the word 14) present within the selection block 20 is extracted (step S19) from that for the image, and the extracted image is then rotated (step S20) through $-\theta$, so as to is ready it for further processing, such as OCR.

Figure 9:
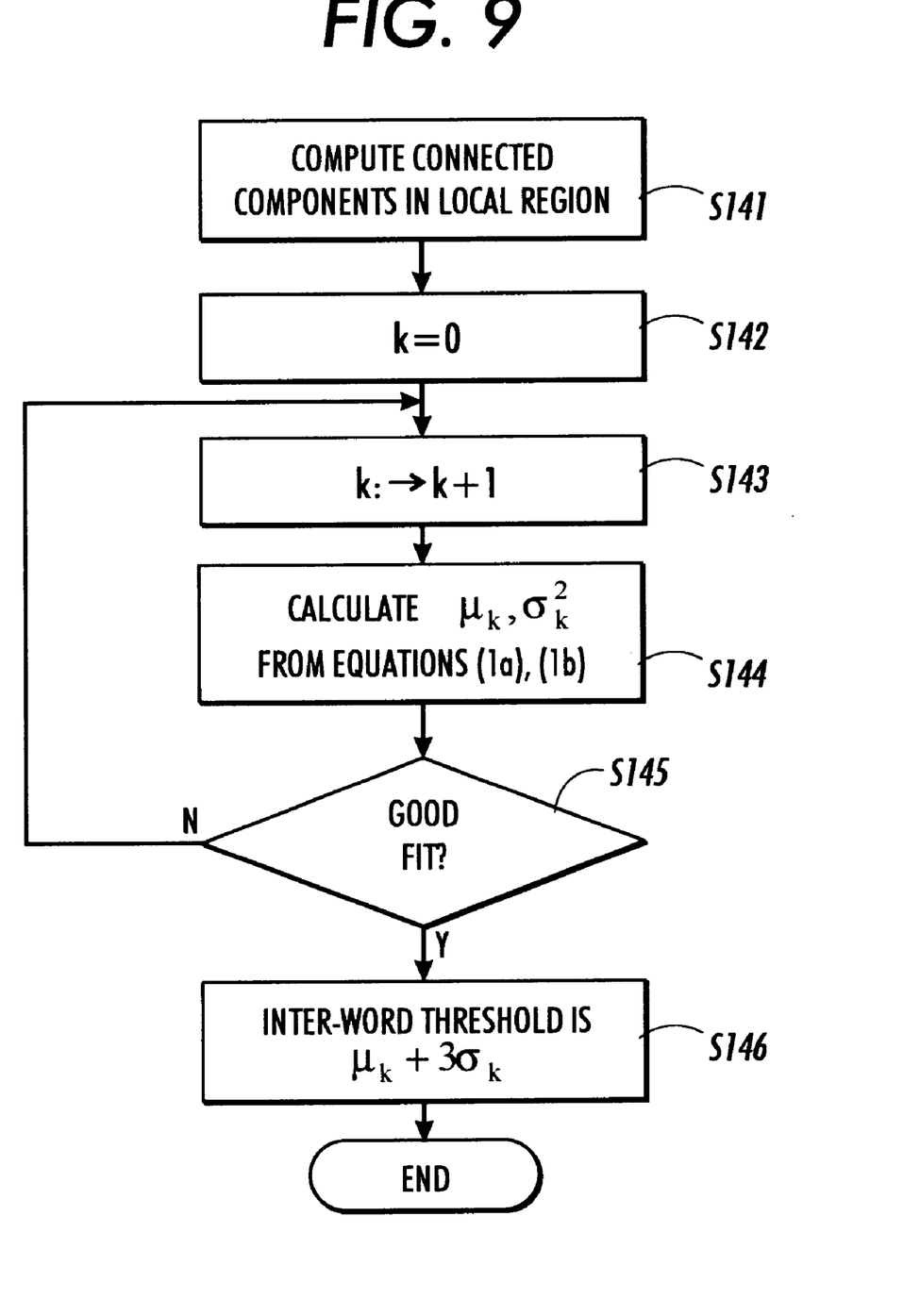
FIG. 9 shows in more detail the technique (step S14 in FIG. 8) for determining the local inter-word threshold.

FIG. 9 shows in more detail the technique (step S14 in FIG. 8) for determining the local inter-word threshold $(s_w)_{min}$. Initially (step S141), using techniques known in the art for computing connected components, the character-character separations are measured for each pair of adjacent characters in the local region. Here, the previously obtained skew information ($\theta$) is used to make the O'Gorman Docstrum techniques (Lawrence O'Gorman, "The Document Spectrum for Page Layout Analysis", *in IEEE Transactions On PAMI*, Vol. 15, No. 11, November 1993) run faster. O'Gorman used a connected component nearest neighbors method to find skew and inter-character and inter-line spacing. We use the skew information to find nearest neighbors in the line to give us inter-character information, and connected component heights to group blocks of consistent font size.

A histogram is formed of horizontal gaps between the connected components of equal font size. This is ideally is a bimodal distribution (see FIG. 10A), i.e. with a first peak (mode) 36 corresponding to inter-character spacing ($s_c$), and a second peak (mode) 38 corresponding to inter-word spacing ($s_w$). FIG. 10B shows a plot 40 of the real measured value for a typical sample, together with two curves sought to be fitted to the plot of the real data curve 40 —a curve 42 for a cubic fitting and a curve 44 for a quartic fitting. The curves 42 and 44 intersect with the separation (distance) axis at 1' and 1", respectively.

The intersection (1') for the best fitting curve 42 may be used as the value of $(s_w)_{min}$. However, in the preferred embodiment, an attempt is made to make a best fit of a Gaussian curve to the first mode 36 in FIG. 10A, and this is shown in FIG. 10C. Obtaining the best fitting of the Gaussian curve 46 imputes an "intersection"(1) on the separation axis: this value is used as $(s_w)_{min}$ and must be determined.

Returning to FIG. 9, step S141 is followed by steps for finding the best fit, using 2k values about the value i=m, where "m" is the value at which the Gaussian curve 46 has its peak. First, "k" is set to zero (step S142). In step S143, "k" is incremented by one, and then values for $\mu_k$ (the average of (2k+1) values around the mode) and $\sigma_k^2$ (the variance of (2k+1) values around the mode) are computed (step S144) according to the equations:

$$\mu_k = \frac{1}{(2k+1)} \sum_{i=m-k}^{m+k} h(i) \quad (1a)$$

$$\sigma_k^2 = \frac{1}{(2k+1)} \sum_{i=m-k}^{m+k} \{h(i) - \mu_k\}^2 \quad (1b)$$

The proportion of data in (2k+1) values around the mode is given by:

$$p_k = \frac{\sum_{i=m-k}^{m+k} h(i)}{\sum_{i=0}^{N} h(i)} \quad (1c)$$

At step S145, an analysis is made of whether the curve is a good fit: this is done using the well known Chi-squared test. If the test fails, processing returns to step S143. This is continued until the test of step S145 is passed. Upon the test being passed the value of the inter-word spacing (threshold) $(s_w)_{min}$ has been found and is equal to $\mu_k + 3\sigma_k$ (step S146).

As can be seen, reliable determination of inter-character spacing enables us to segment out single words with a double click. Click-and-drag selection of multiple words needs further knowledge of the column limits. This is done using a technique due to Pavlidis (Pavlidis, T. and Zhou, J., "Page Segmentation and Classification," CVGIP, *Graphical Models and Image Processing*, Vol. 54, No. 6, November 1992 pp. 484–496) based on vertical projection profiles at the connected component level. Again, the sample image used to establish column boundaries is grown until confidence measures are above specified levels. This interface has a slightly longer inherent delay than that of section B for finding skew alone, but with faster hardware this may become unimportant.

A technique of highlighting a word by a "double-click" has been described. It will be appreciated that, through simple modification of the techniques of FIGS. 8–10, and using well known techniques for finding sentence boundaries and the aforementioned methods of determining text (column) limits, techniques may be provided for indicating selection, in response to a third mouse click, of the whole sentence containing the word selected by the double click. I.e., the second click of the user's double click becomes an intermediate user input and the third click the final user input defining the end of selection.

Figure 10A:
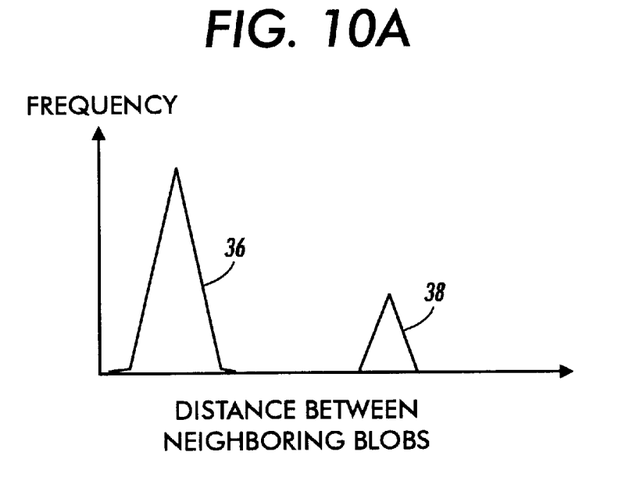
Figure 10B:
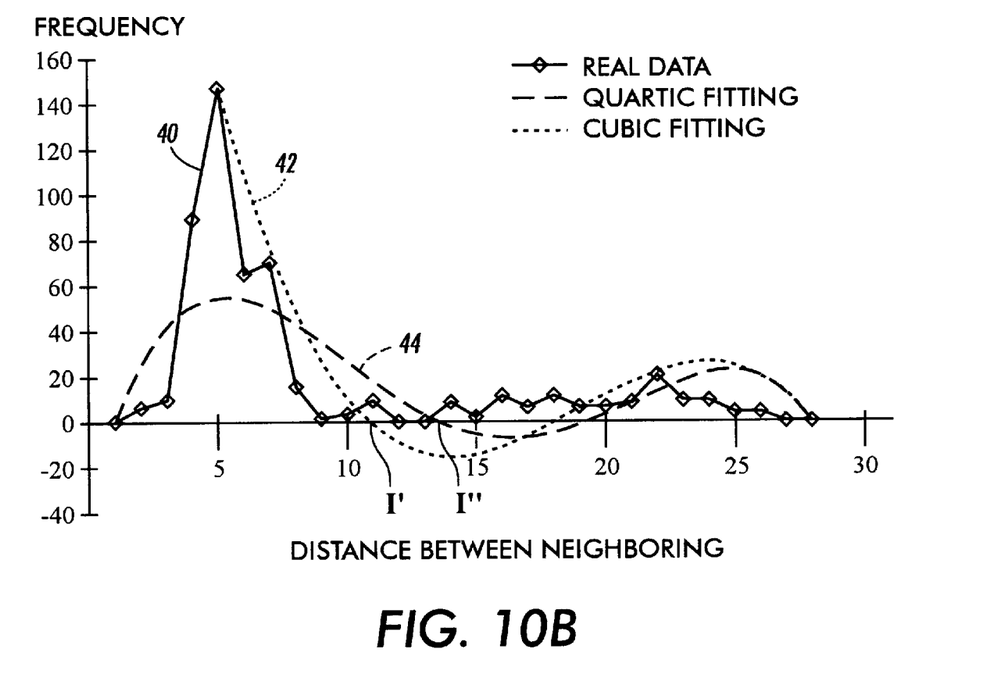
Figure 10C:
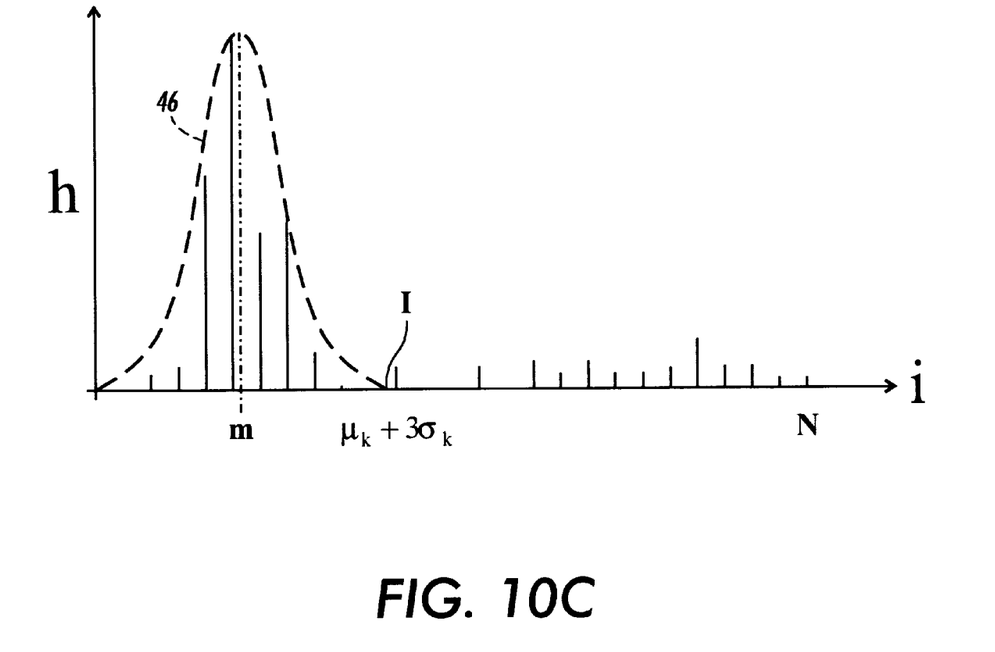

Furthermore, it will be appreciated that, through simple modification of the techniques of FIGS. 8–10, and using the aforementioned methods of determining text (column) limits, techniques may be provided for indicating selection, in response to a selection comprising click, drag and release, of the whole of the text matter between the point of the initial click and the release of the mouse button. I.e., there is a first user input at the first mouse click (with the left mouse button being held down), an infinite number of intermediate "user inputs" as the cursor is dragged across the text, and the final user input defining the end of selection when the left mouse button is released. This is illustrated in FIG. 11 by grab area 30 (the column (i.e., horizontal) limits are omitted for the sake of clarity/illustration).

Figure 11:
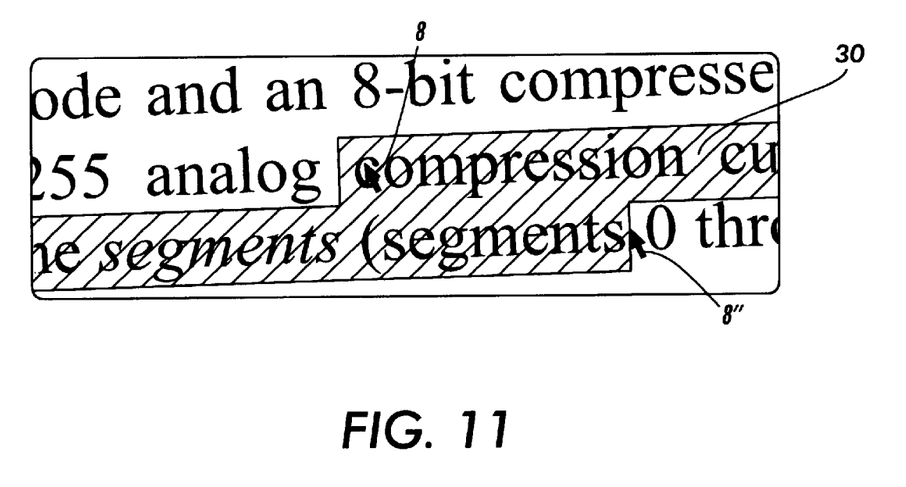
FIG. 11 illustrates text selection by diagonal sweep in an alternative embodiment of the invention.

To produce the result shown in FIG. 11, the process begins with the user's left mouse button click to start selection. The skew angle is determined as described above and then the column boundaries derived using techniques based on the aforementioned work of Pavlidis.

Next, a small vertical portion of the column is segmented. With knowledge of skew angle and column boundaries, this step could simply be to segment the whole column to locate the position of each of the words. However, word segmentation tends to be a slow operation, so instead, we divide the column into small horizontal strips and segment each of these separately. This segmentation process operates in a separate thread of program execution, thus allowing the user to freely continue moving the cursor, and for the system to update the selection display. This leads to a relatively fast interactive display, whilst at the same time, allowing anything from a single word, to a whole column to be selected.

D. Copy to Clipboard

Once the user has selected a region, the next step is to copy it to the Windows® clipboard. As previously described, this can be done in a number of different ways. The operations that are performed on the selected region prior to it being copied depend not only on the way in which it is copied, but also on the way in which it was selected. Table 1 highlights the operations necessary for copying a selected region.

TABLE 1

| Selection method: | Rectangular Selection Box | Skewed Selection Box | Word-To-Word Selection |
|---|---|---|---|
| Copy as: Text | Copy region. Binarize. OCR. | Copy region. Rotate. Binarize. OCR. | Copy region. Rotate. Mask unwanted text. Binarize. OCR. |
| Copy as: Color Image | Copy region. | Copy region. Rotate. | Copy region. Rotate. Mask unwanted text. |
| Copy as: Grey-Scale Image | Copy region. Convert color to grayscale. | Copy region. Rotate. Convert color to grayscale. | Copy region. Rotate. Mask unwanted text. Convert color to grayscale. |
| Copy as: Binary Image | Copy region. Binarize. | Copy region. Rotate. Binarize. | Copy region. Rotate. Mask unwanted text. Binarize. |

For example, if the region was selected using the skewed selection box and a color image is required, we first make a local copy of the selected region, de-skew by rotating it through the skew angle, and then place it on the clipboard.

A more complex example is copying as text following a word-to-word selection. In this case, it is also necessary to mask out unwanted text from the beginning and end of the first and last lines of text. This is followed by converting the color image to a black and white image (binarization), which is then passed to the OCR engine. Finally, the text returned by the OCR engine is then placed on the clipboard. Of all these operations, one of the most important is the binarization stage, particularly when followed by OCR. Due to the low resolution of the camera images, coupled with possible lighting variations, unacceptable results will be obtained if the camera image is binarized using a simple threshold algorithm. Therefore, the image enhancement and thresholding techniques of U.S. patent application Ser. No. 09/081, 269, entitled "Method And Apparatus For Enhancing And Thresholding Images" are suitably used.

It will be further appreciated that a function may be provided (selectable by the user using a button on a toolbar of the UI) for when the user is invoking the 'Copy as text' function, enabling the line breaks to be removed from the OCRed text. This is useful, for example, when the text is to be pasted into a word processor. Furthermore, another such toolbar button may provide the option of the user viewing the selection they have copied in a preview window, in a manner similar to the clipboard viewer on a conventional PC.

E. Summary

Described above are various techniques for text and/or image selection. It will be appreciated that these techniques may be used in conjunction with image enhancement and thresholding techniques for generating enhanced binary image data from gray scale image data. An example of such an image enhancement and thresholding technique is described in U.S. patent application Ser. No. 09/081,269, entitled "Method And Apparatus For Enhancing And Thresholding Images", which is incorporated herein by reference.

It will also be appreciated that the steps of the present invention set forth in the Figures and described herein can be readily implemented by one skilled in the art on a programmable image processing system. An example of such an image processing system is illustrated in FIG. 12 and would include a processor 90, and a memory 91, an image capture device 92, an image display device 93 and a user input device 94 coupled to the processor 90.

In the case where the user employs a "click-and-drag" of the mouse defining two points, the remaining degree of freedom in the selection of a rectangle in the image is the skew of the text. The invention employs skew angle detection techniques to this document camera case where the location of "skew-pertinent" information is supplied by the user with the mouse, having extracted an intermediate image from the underlying grayscale image. The method is fast enough to find skew within less than 0.5 s for most font sizes, which is fast enough to provide a pleasing interface. A similar effect is obtained for singleword and multi-word selection techniques.

Furthermore, it will be appreciated that the present invention may be readily implemented in software using software development environments that provide portable source code that can be used on a variety of hardware platforms. Alternatively, the present invention may be implemented partially or fully in hardware using standard logic circuits. Whether software or hardware is used to implement the present invention varies depending on the speed and efficiency requirements of the particular operating environment and also the particular function and the particular software or hardware systems and the particular microprocessor or microcomputer systems being utilized.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for selecting text and image data from documents with an image processing system in which images of documents are captured by an image capture device having a field of view, comprising the steps of:

(a) displaying an image captured by the image capture device; the displayed image containing text matter being defined by one of grayscale image data and color image data;

(b) receiving a first user input defining both a start of a selection and a first position within the displayed image;

(c) responsive to said step (b), freezing the displayed image to define a frozen displayed image;

(d) determining a skew angle $\theta$ of the text matter with respect to the field of view of the image capture device;

(e) receiving a second user input defining both an end of the selection and a second position within the displayed image; the second user input defining a final user input;

(f) determining, using the skew angle $\theta$ determined in said step (d), a selection element; the selection element having a position, a shape and dimensions that are, at least, dependent upon the first position; and (g) displaying the selection element superimposed on the frozen displayed image;

wherein step (f) further comprises the steps of:

selecting a word of the text matter within the displayed image; said step (f) determining the selection element to include a selection block overlaying the word;

(f1) determining a word separation value $(S_w)_{min}$ from measured values of separation between adjacent pairs of characters in the text matter; and (f2) determining dimensions of the selection block in a direction of flow of the text matter as a function of the word separation value $(S_w)_{min}$ determined in said step (f1).

2. The method according to claim 1, wherein said step (f1) further comprises the steps of:

(f1i) forming a histogram of frequency versus inter-character spacing for each pair of adjacent characters within a portion of the text matter near the first position;

(f1ii) determining a best-fitting curve using a plurality of distinct Gaussian curves; the best-fitting curve forming a best fit with a predetermined mode of the histogram formed in step (f1i); and (f1iii) determining an estimate point on an inter-character spacing axis of the histogram at which the best-fitting curve satisfies a predetermined criteria.

3. The method according to claim 2, wherein said step (f1ii) determines the estimate point using the equation given by:

$$(S_w)_{min} = \mu_k + 3\sigma_k,$$

where:

$$\mu_k = \frac{1}{(2k+1)} \sum_{i=m-k}^{m+k} h(i), \text{ and}$$

$$\sigma_k^2 = \frac{1}{(2k+1)} \sum_{i=m-k}^{m+k} \{h(i) - \mu_k\}^2.$$

4. The method according to claim 1, wherein said step (f) further comprises the steps of:
 (f3) determining a line spacing ($S_l$) between adjacent lines of the text matter; and
 (f4) determining dimensions of the selection block in a direction perpendicular to the flow of the text matter as a function of the line spacing ($S_l$).

5. The method according to claim 4, wherein said step (f) further comprises the steps of:
 (f5) determining a first horizontal limit and a second horizontal limit of the text matter;
 (f6) determining whether the first position and the second position are on different lines of the text matter; and
 responsive to said step (f6) determining the first position and the second position are on different lines of the text matter, performing the steps of:
  (f2i) for an upper portion of the selection block, overlaying the text matter between the first position and the first horizontal limit of the text matter;
  (f2ii) for a lower portion of the selection block, overlaying the text matter between the second position and the second horizontal limit of the text matter; and
  (f2iii) for any portion of the selection block interposed between the lower portion of the selection block and the upper portion of the selection block, overlaying the text matter between the first horizontal limit and the second horizontal limit.

6. An apparatus for selecting text and image data from documents, comprising:
 an image capture device having a field of view;
 a memory for storing instructions, and the text and the image data from the documents;
 a processor for communicating with said image capture device and said memory; said processor for executing the instructions stored in said memory;
 a display, controlled by said processor, for displaying an image capture image capture device; the displayed image containing text matter being defined by one of grayscale image data and color image data; and
 a user input device, coupled to said processor, for receiving a first user input and a second user input; the first user input defining both a start of a selection and a first position within the displayed image; the second user input defining both an end of the selection and a second position within the displayed image;
 wherein the instructions stored in said memory further comprises:
  means for freezing the displayed image to define a frozen displayed image;
  means for determining a skew angle θ of the text matter with respect to the field of view of said image capture device; and
  means for determining, using the skew angle θ, a selection element; the selection element having a position, a shape, and dimensions that are, at least, dependent upon the first position; and
  means for superimposing the selection element on the frozen displayed image displayed on said display;
 wherein the instructions stored in said memory further comprise:
  means for selecting a word of the text matter within the displayed image; said selecting means determining the selection element to include a selection block overlaying the word;
  means for determining a word separation value ($S_w$)$_{min}$ from measured values of separation between adjacent pairs of characters in the text matter; and
  means determining dimensions of the selection block in a direction of flow of the text matter as a function of the word separation value ($S_w$)$_{min}$.

7. The apparatus according to claim 6, wherein the instructions stored in said memory further comprise:
 means for forming a histogram of frequency versus inter-character spacing for each pair of adjacent characters within a portion of the text matter near the first position;
 means for determining a best-fitting curve using a plurality of distinct Gaussian curves; the best-fitting curve forming a best fit with a predetermined mode of the histogram; and
 means for determining an estimate point on an inter-character spacing axis of the histogram at which the best-fitting curve satisfies a predetermined criteria.

8. The apparatus according to claim 7, wherein the estimate point is determined using the equation given by:

$$(S_w)_{min} = \mu_k + 3\sigma_k,$$

where.

$$\mu_k = \frac{1}{(2k+1)} \sum_{i=m-k}^{m+k} h(i), \text{ and}$$

$$\sigma_k^2 = \frac{1}{(2k+1)} \sum_{i=m-k}^{m+k} \{h(i) - \mu_k\}^2.$$

9. The apparatus according to claim 7, wherein the instructions stored in said memory further comprise:
 means for determining a line spacing ($S_l$) between adjacent lines of the text matter; and
 means for determining dimensions of the selection block in a direction perpendicular to the flow of the text matter as a function of the line spacing ($S_1$).

10. A method for selecting text and image data from documents with an image processing system in which images of documents are captured by an image capture device having a field of view, comprising the steps of:
 (a) displaying an image captured by the image capture device; the displayed image containing text matter being defined by one of grayscale image data and color image data;
 (b) receiving a first user input defining both a start of a selection and a first position within the displayed image;
 (c) responsive to said step (b), freezing the displayed image to define a frozen displayed image;
 (d) determining a skew angle θ of the text matter with respect to the field of view of the image capture device;
 (e) receiving a second user input defining both an end of the selection and a second position within the displayed image; the second user input defining a final user input;

(f) determining, using the skew angle θ determined in said step (d), a selection element; the selection element having a position, a shape, and dimensions that are, at least, dependent upon the first position;

(g) displaying the selection element superimposed on the frozen displayed image; and (h) receiving a third user input after receiving the second user input; the third user input indicating selection of a sentence containing a word identified by the first user input and the second user input.

11. An apparatus for selecting text and image data from documents, comprising:

an image capture device having a field of view;

a memory for storing instructions, and the text and the image data from the documents;

a processor for communicating with said image capture device and said memory; said processor for executing the instructions stored in said memory;

a display, controlled by said processor, for displaying an image captured by said image capture device; the displayed image containing text matter being defined by one of grayscale image data and color image data; and a user input device, coupled to said processor, for receiving a first user input and a second user input; the first user input defining both a start of a selection and a first position within the displayed image; the second user input defining both an end of the selection and a second position within the displayed image;

wherein the instructions stored in said memory further comprises:

means for freezing the displayed image to define a frozen displayed image;

means for determining a skew angle θ of the text matter with respect to the field of view of said image capture device; and means for determining, using the skew angle θ, a selection element; the selection element having a position, a shape, and dimensions that are, at least, dependent upon the first position; and means for superimposing the selection element on the frozen displayed image displayed on said display;

wherein said user input device receives a third user input after receiving the second user input; the third user input indicating selection of a sentence containing a word identified by the first user input and the second user input.

12. A method for selecting text and image data from documents with an image processing system in which images of documents are captured by an image capture device having a field of view, comprising the steps of:

(a) displaying an image captured by the image capture device; the displayed image containing text matter being defined by one of grayscale image data and color image data;

(b) receiving a first user input defining both a start of a selection and a first position within the displayed image;

(c) responsive to said step (b), freezing the displayed image to define a frozen displayed image;

(d) determining a skew angle θ of the text matter with respect to the field of view of the image capture device;

(e) receiving a second user input defining both an end of the selection and a second position within the displayed image; the second user input defining a final user input;

(f) determining, using the skew angle θ determined in said step (d), a selection element; the selection element having a position, a shape, and dimensions that are, at least, dependent upon the first position;

(g) displaying the selection element superimposed on the frozen displayed image;

(h) extracting image data defining the selection element from the image; and (l) rotating the extracted image data through a negative angle of the determined skew angle θ.

13. The method according to claim 12, wherein said step (d) further comprises the step of determining the skew angle θ of a first portion of the text matter that is near the first position.

14. The method according to claim 12, wherein said step (f) identifies the selection element to be a rectangle having two opposing corners coincident with the first position and the second position.

15. The method according to claim 12, wherein said step (f) further comprises the step of selecting a word of the text matter within the displayed image; said step (f) determining the selection element to include a selection block overlaying the word.

16. An apparatus for selecting text and image data from documents, comprising:

an image capture device having a field of view;

a memory for storing instructions, and the text and the image data from the documents;

a processor for communicating with said image capture device and said memory; said processor for executing the instructions stored in said memory;

a display, controlled by said processor, for displaying an image captured by said image capture device; the displayed image containing text matter being defined by one of grayscale image data and color image data; and a user input device, coupled to said processor, for receiving a first user input and a second user input: the first user input defining both a start of a selection and a first position within the displayed image; the second user input defining both an end of the selection and a second position within the displayed image;

wherein the instructions stored in said memory further comprises:

means for freezing the displayed image to define a frozen displayed image;

means for determining a skew angle θ of the text matter with respect to the field of view of said image capture device; and means for determining, using the skew angle θ, a selection element; the selection element having a position, a shape, and dimensions that are, at least, dependent upon the first position;

means for superimposing the selection element on the frozen displayed image displayed on said display;

means for extracting image data defining the selection element from the image; and means for rotating the extracted image data through a negative angle of the determined skew angle θ.

* * * * *